June 18, 1968   J. L. SMITH, JR., ETAL   3,388,480
FLUIDIZING APPARATUS FOR ROASTING
Filed Aug. 25, 1964   4 Sheets-Sheet 1
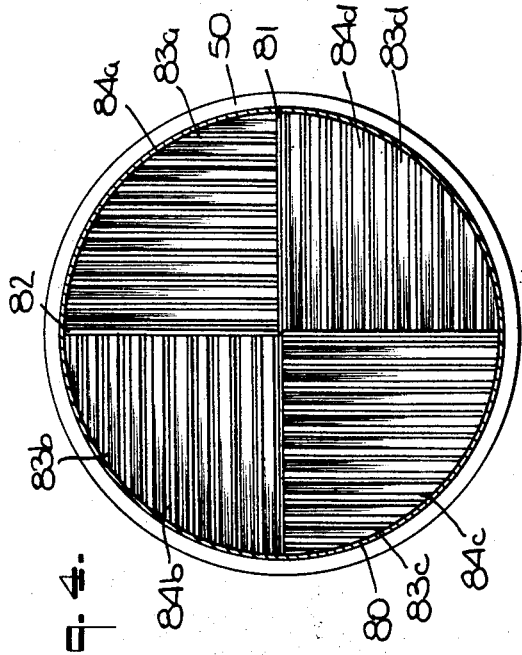
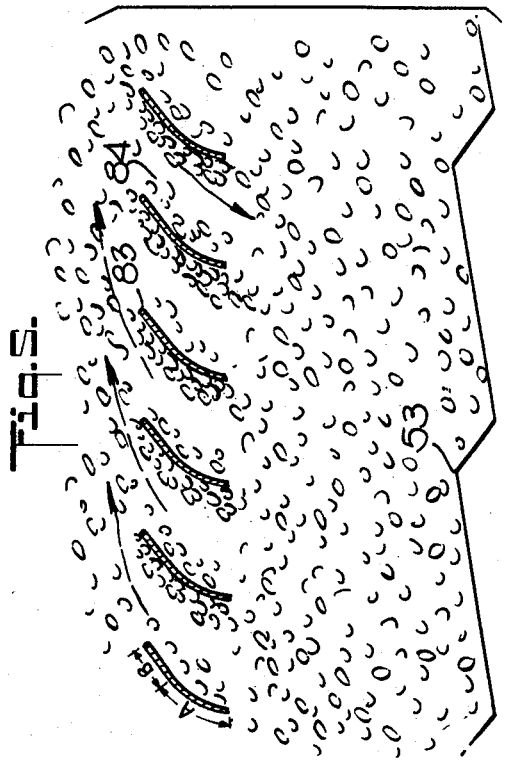
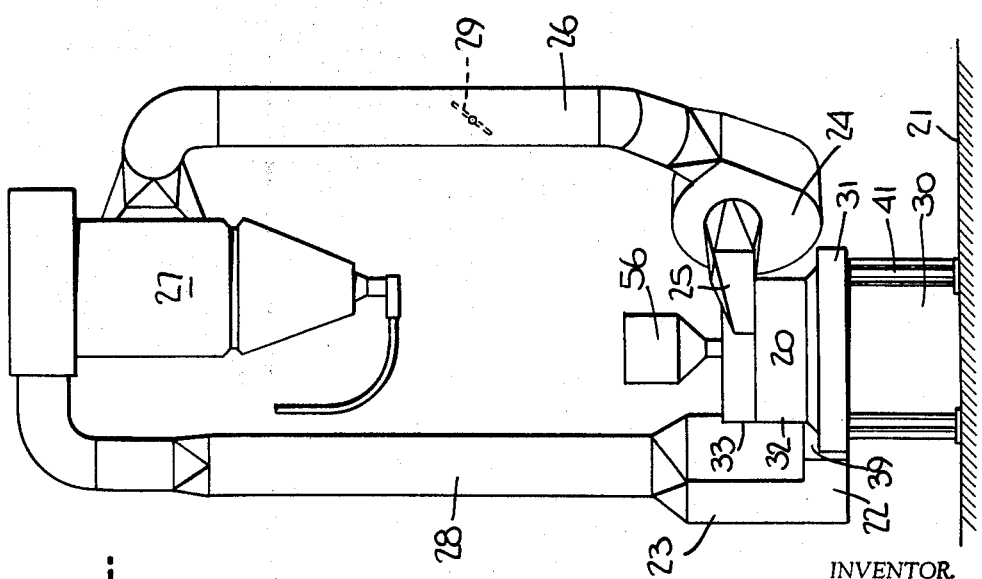
INVENTOR.
JOSEPH L. SMITH, JR.
BY JOSEPH H. KEENAN
ATTORNEY

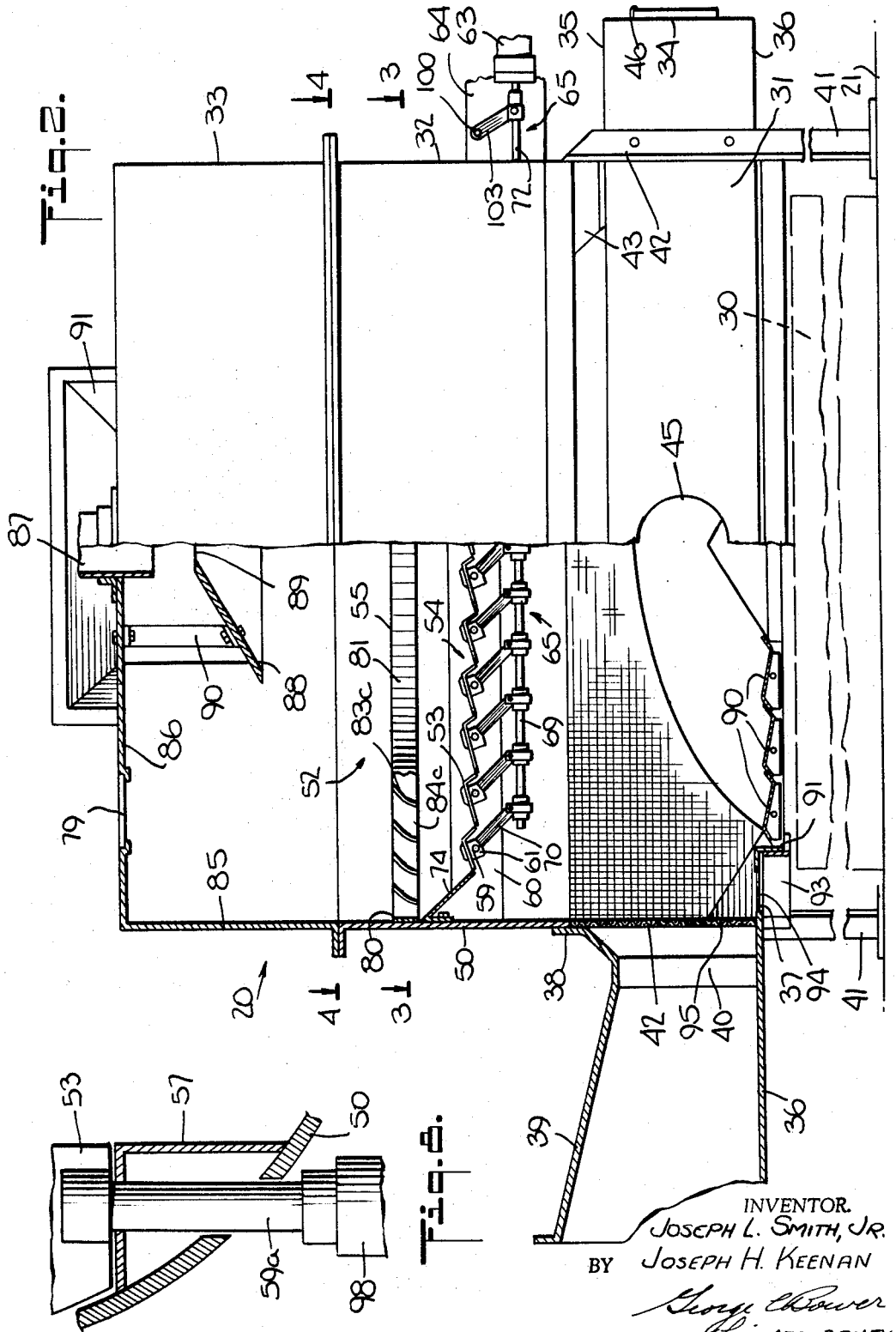

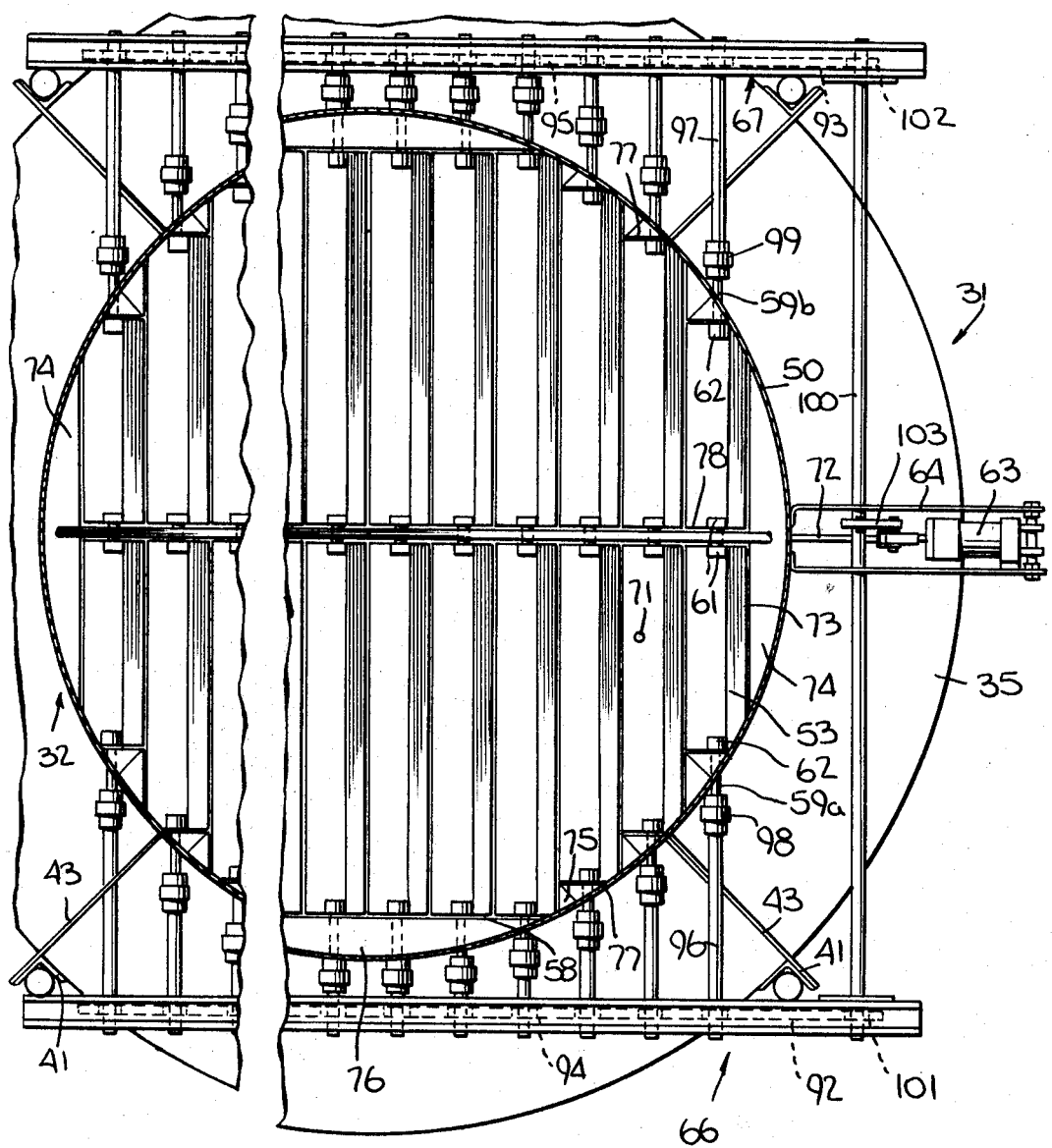

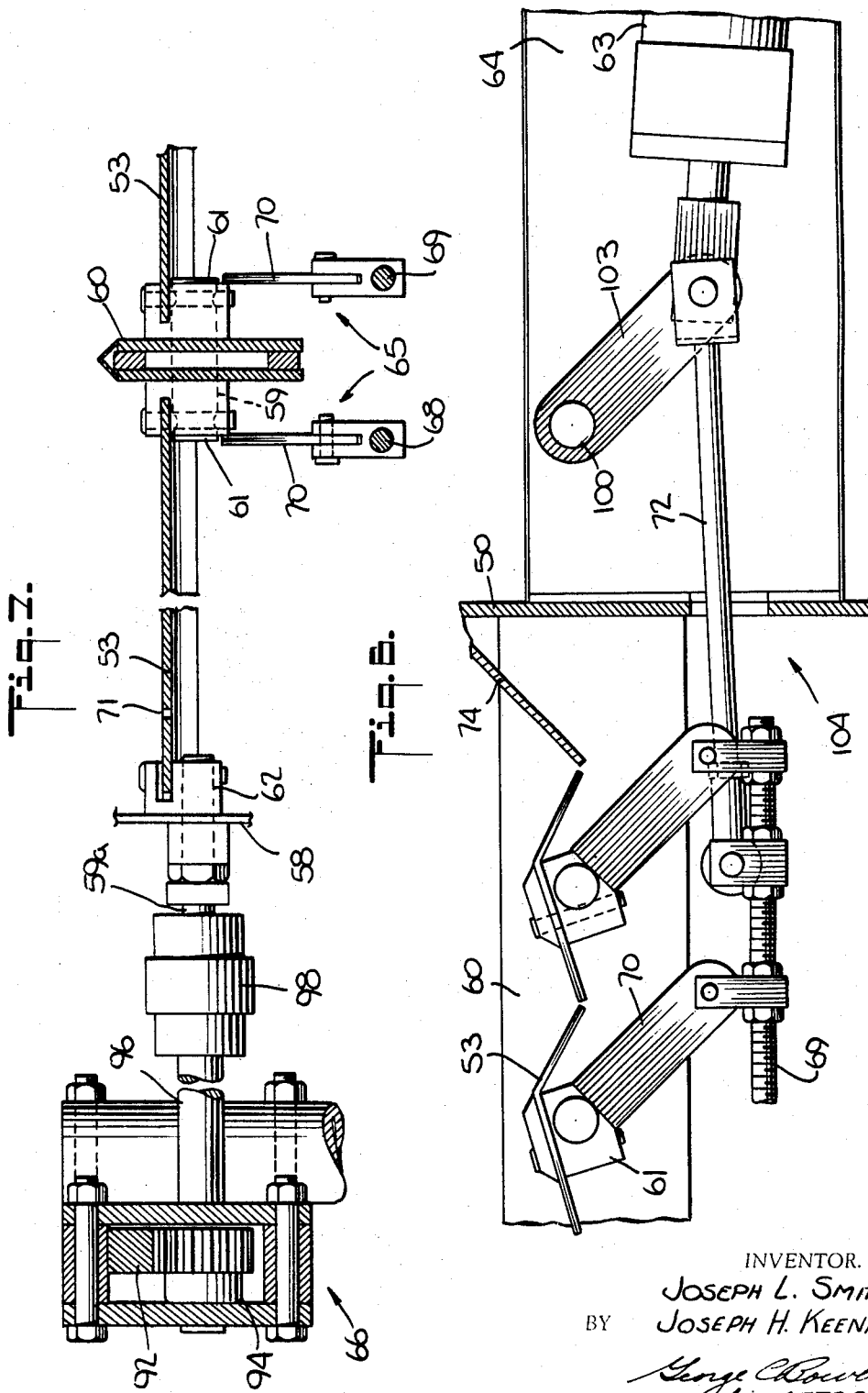

United States Patent Office 3,388,480
Patented June 18, 1968

3,388,480
FLUIDIZING APPARATUS FOR ROASTING
Joseph L. Smith, Jr., Concord, and Joseph H. Keenan, Belmont, Mass., assignors to Blaw-Knox Company, Pittsburgh, Pa., a corporation of Delaware
Filed Aug. 25, 1964, Ser. No. 392,004
9 Claims. (Cl. 34—57)

ABSTRACT OF THE DISCLOSURE

An organic food granule treating apparatus has a circular treating chamber with a perforated shelf passing treating gases to fluidize the granules in a dense phase, and has sets of horizontal parallel vanes curved to the vertical positioned above the shelf and within the dense phase of the granules. The vanes of adjacent sets are at an angle to horizontally circulate the granules around the treating chamber to provide a uniform treatment of the granules. The shelf is formed in sections rotatably mounted and actuated between a closed treating position and an open discharge position.

Background of invention

This invention relates to the roasting of organic granules such as coffee beans, cocoa beans, nuts, peanuts, cereals and the like, and is directed particularly to the roasting of coffee beans.

Most commercial roasters roast the material in horizontal drums agitating and mixing the granules by rotating the drum or by rotating blades inside the drum. For some time it has been desirous to develop a roaster that occupies less floor space and is less expensive to manufacture. Such a roaster passes the roasting gases vertically upward as agitating streams through the material in a horizontal formation. The agitating roasting streams fluidize and circulate the granules within the formation. In addition to this circulation, the granules must be horizontally redistributed to produce a uniform roast.

In the United States patent application Ser. No. 9,943 of Joseph L. Smith, filed on Feb. 19, 1960, and entitled, "Method of Roasting," now Patent No. 3,149,976 the granular material was divided into separate formations on a plurality of vertically spaced shelves with the granular material moved successively downward from shelf to shelf. This movement, in addition to the streams of air, redistributed the granular material horizontally.

However, it is now more desirable to have a single formation. This presents the requirement of horizontally redistributing the granular material in the formation during the roasting process and arranging the formation to best attain the circulation of the beans.

Summary of the invention

A cylindrical chamber for treating organic food granules has a horizontal shelf and horizontal vanes spaced above the shelf. The shelf has openings for passing treating gases to fluidize the granules in a dense phase and vertically circulate the granules. The vanes are formed in sets with the vanes of a given set being parallel and at an angle to the vanes of adjacent sets to horizontally circulate the granules for a uniform treatment. Further specific features are the formation of the shelf in shelf sections which are rotatably mounted and actuated by drive means between discharge and treating positions.

An object of the invention is to provide a roaster with roasting gases passing vertically upwardly in the form of streams through a single horizontal formation of granular material circulating the granular material vertically and horizontally to produce a uniform roast.

Another object of the invention is to provide a roaster circulating the granular material vertically and horizontally in a single horizontal formation that is inexpensive to manufacture and economical on the floor space required.

Various other objects and advantages will be apparent from the following description taken in connection with the drawings.

Brief description of the drawings

FIG. 1 is a side view of the complete roasting system;

FIG. 2 is a side view of the roaster with the half of the roaster shown in section;

FIG. 3 is a sectional view of the roaster taken along lines 3—3 of FIG. 2 to provide a top view of the perforated shelf;

FIG. 4 is a sectional view of the roaster taken along lines 4—4 of FIG. 2 to provide a top view of the mixing vanes;

FIG. 5 is a fragmentary diagrammatic view of the fluidized granular material illustrating the effect of the mixing vanes;

FIGS. 6 and 7 are fragmentary views illustrating the shelf actuating means; and

FIG. 8 is an enlarged fragmentary view of the side pivotal support for a shelf grate.

Detailed description

In FIG. 1 the complete roasting system is illustrated. The description of the system will be in connection with roasting coffee beans. The roaster 20 is mounted on legs 41 spacing the roaster from the floor 21. A conventional cooler 30 is positioned beneath the roaster for receiving coffee therefrom. Heated air is introduced at the bottom of the roaster through the duct 22 from the burner section 23 and is withdrawn from the top of the roaster by the centrifugal fan 24 through the duct 25. The exhaust air is forced by the fan 24 through the duct 26 upwardly to a cyclone collector 27. A damper 29 is provided to control the amount of pressure on the beans and the volume of heated gases passed. This is adjusted as the roasting proceeds since the beans discharge more moisture at the beginning of the roast than later in the roast. The cyclone collector operates in the usual manner to remove debris suspended in the exhaust air. The cleaned air is recirculated to the burner section 23 through the duct 28 connected between the top of the cyclone collector and the burner 23. The green coffee beans are supplied through the top of the roaster 20 from a hopper 56, and the roasted beans are discharged through the bottom of the roaster into a cooler 30.

As illustrated in FIG. 2 the roaster comprises a bottom section 31, a roasting section 32 and a top section 33. The roasting section 32 and top section 33 form a roasting chamber 52 with perforated grates extending horizontally across the bottom of section 32 to support the coffee beans in the quiescent state and during the roasting process form streams of heated gases fluidizing the beans in a dense phase horizontal formation. The bottom section 31 passes the heated gases into the roaster and uniformly distributes the heated gases so as to pass in an even flow through the perforated grates. 53. Spaced above the grates and intermediate the fluidized formation of the beans is a circulating member 55 imparting a horizontal component to the individual beans so that the mass of coffee beans circulates horizontally around the roasting chamber. The heated gases are exhausted through the top section 33.

The bottom section 31 has a cylindrical side wall 34 and an upper wall 35 and a lower wall 36. The lower wall 36 has shutters 90 mounted in the opening 37. The coffee beans are discharged from the roaster through the shutters when tilted open. The upper wall 35 has a conical-shaped flange 38 joining the sections 31 and 32. An inlet duct 39 extending generally in the plane of the section 31 is mounted on the side of the cylindrical wall 34 for passing heated gases through the opening 40 in the cylindrical wall 34. As illustrated, the side wall 34 is of greater diameter than the section 32 and forms with the cylindrical screen or air distribution member 42 an air distribution passage around the roaster. The heated gases introduced into the section 31 through the inlet duct 39 are distributed around the roaster by this passage. The screen forms a resistance to the flow of the heated gases to provide a peripheral distribution of the heated gases so that the heated gases are supplied evenly underneath the grates 53.

The shutters 90 are pivotally mounted in the rectangular frame 91 attached at the corners to the legs 41 by brackets 93. Since the opening 37 is circular, spaces 94 are formed between the frame and the lower wall 36. Sloped elliptical sheet metal seals or fillets 95 are provided extending from the lower wall 36 over the inner side of the rectangular frame to close the openings and to guide the discharged beans past the tilted shutters. The shutters 90 are of a generally Z shape with the edge portions overlapping to form an air lock preventing the passage of heated gases through the bottom of the roaster. The shutters may be actuated by a conventional lever system. The section 31 is supported by four legs 41 a distance above the floor 21 to provide room for the cooler 30. The legs 41 are secured to the side wall 34 and to the upper wall 35 by means of the braces 43. Openings 45 are provided at convenient locations in the side wall 34 for access to the inside of the section 31. Covers 46 are provided to seal the openings.

The roaster section 32 has a cylindrical wall 50 extending upwardly from the section 31 and supports horizontal grates 53 to form a shelf 54 for supporting coffee beans when in a quiescent state.

The grates 53 which may be considered as shelf sections are bent longitudinally into two portions at an angle to one another. A center beam 60 extends diametrically across the section 32 for supporting the grates at the center thus dividing the grates into two sets. The grates are mounted at each end in blocks 61, 62 (FIG. 3). A shaft 59 is rotatably mounted in the center beam 60 and the blocks 61 are fixedly attached thereto. At the outer end of the grates the blocks 62 are attached to shafts 59a and 59b. The shafts 59a and 59b are rotatably supported by the flat side brackets 58 and the L-shaped brackets 57. These brackets are secured to the cylindrical side wall 50 in any suitable manner, such as welding or by bolts (FIG. 8).

The grates are actuated by an air cylinder 63 mounted in a frame 64 attached to the side wall 50 (FIG. 6). The air cylinder 63 is connected to the grates by a linkage mechanism 65 at the center of the roaster and by rack and pinion mechanisms 66 and 67 on the sides of the roaster. The linkage mechanism 65 comprises two rods 68, 69 extending across the roaster below the grates, arms 70 and a link 72. The link 72 is pivotally connected to the air cylinder 63 and to the rods 68 and 69. The arms 70 are fixedly attached to the blocks 61 on opposite sides of the center beam 60 and pivotally connected to the rods 68 and 69. The arms are at a substantial angle to the normal to provide an arc of greater than 90 degrees through which the arms may be rotated by the rods 68 and 69 on actuation of the air cylinder 63. This provides a substantial tilt to the grates for discharging the coffee beans resting thereon. The rack and pinion gear mechanism comprises racks 92 and 93 meshing with gears 94 and 95 on shafts 96 and 97 which are connected to the shafts 59a and 59b by couplings 98 and 99 respectively. The racks 92 and 93 are driven by means of shaft 100 with gears 101 and 102 meshing with the racks and by the link 103 fixedly attached to the shaft 100 and pivotally connected to the air cylinder 63. Thus the grates 53 are mechanically actuated both at the center of the roaster and at the sides to ensure the complete closing of the grates.

The grates 53 have a large number of small openings 71 (FIGS. 3 and 7) for passing the heated air through the shelf 54 and are dimensioned to uniformly distribute the heated air across the entire shelf 54 and to provide sufficient pressure difference to properly fluidize the coffee beans. The openings form the heated air into agitating streams of air and as illustrated in FIG. 7 are at an angle to the normal due to the angularity of the grate portions. Since the grates 53 are rectangular in shape and the side wall 50 is cylindrical in shape, cover means 74 are provided at each end of the center beam 60 to cover the space between the air currents and the side wall 50, and triangular shaped covers 75 are provided over the brackets 57 and cover means 76 is provided between the brackets 58 and the wall 50. The cover means 74, 75 and 76 are sloped so as not to collect coffee beans thereon and are mounted on the wall in any suitable manner. The cover means 74, 75 and 76 block the spaces between the wall 50 and the grates 53 so that the heated air is restricted to pass through the openings 71. The spaces 73 between the grates, spaces 77 and 78 between the ends of the grates and the brackets 57 and 58 and the center beam 60 are reduced to a minimum so as not to pass the heated air.

The coffee bean circulator 55 comprises a circular band 80 and crosspieces 81 and 82 to divide the circulating member into four quadrants. As illustrated in FIGS. 2 and 4, vanes 83a, b, c and d are mounted in a respective quadrant and tilted and curved at an angle to the vertical. Spaces 84a, b, c, and d are provided between the vanes of a respective quadrant. The vanes 83a, b, c and d are best illustrated in FIG. 5 and comprise a curved portion A and a straight portion B. The curved portion has a radius about equal to the height of the vane and a center C slightly below the plane or line through the bottom edges of the vanes. The straight portion extends upwardly at an acute angle to the horizontal and terminates so that the horizontal width is about three quarters of the vertical height of the vanes. The vanes are spaced apart a distance in the order of the height of the vanes. The function of these vanes will be considered later herein.

The section 33 is mounted on the section 32 and has a cylindrical wall 85 and a top wall 86 closing the top of the roaster (FIG. 2). The hopper 56 has a feed duct 87 extending through the center of the top wall 86 for delivering green coffee beans to the shelf 54. A conical deflector 88 is positioned below the duct 87 to distribute the beans uniformly over the shelf 54. An opening 89 is provided in the deflector 88 for passing some beans directly through to the shelf 54. The deflector 88 may be mounted on the top wall 86 in any suitable manner, such as by brackets 90. The hopper 56 may be of any conventional type. An air discharge duct 91 is mounted on the side of the section 33 for connecting the roaster to the circulating fan 24. Windows 79 may be provided in the top wall 86 for viewing the roasting process.

The primary function of the grates 53 forming the shelf 54 is to evenly distribute the heated gases throughout the roasting chamber and to form the heated gases into streams. The streams of heated gases due to the volume and velocity fluidize the coffee beans in a generally dense phase. The streams of heated gases have an initial velocity to carry the coffee beans upwardly in the bed and at the upper portion of the bed above the vanes 84a, b, c and d the streams lose velocity and the coffee beans drop back down towards the grates where they are again picked up by the streams and carried upwardly. Thus there is a continuous motion of the entire mass of beans through the vanes and with any individual bean only momentarily resting on a particular grate. The fluidized bed extends well above the circulating member 55 so that it is intermediately positioned or positioned at the middle of the bed. The upwardly moving coffee beans pass along the concave surface of the vane and are projected as indicated by the dash arrows horizontally so as to move over one or more vanes. The coffee beans which have lost an upward velocity move downwardly through the fluidized bed along the convex surface of the vanes dropping down so as to be picked up again by the upwardly moving streams of heated gases. Thus the coffee beans are moved horizontally as well as vertically so that there is a general circulation horizontally through the roasting chamber. Viewed from above, the roasting beans appear to be swirling around the roasting chamber. This horizontal circulation contributes to the uniformity of the roast since during the roasting process if there are any inequalities in the roasting conditions in any portion of the roasting chamber the individual beans will be subjected the same amount to these inequalities. Thus each of the coffee beans will receive substantially the same amount of roasting heat in spite of spatial non-uniformity of gas velocity and temperature.

It is thus seen from the foregoing description that the roaster in a single fluidized formation can uniformly roast coffee beans with vertically upward moving hot gases by circulating the coffee beans both horizontally and vertically. In this particular embodiment there are no dynamic elements. All of the members are stationary in the roaster except the grates 53 and shutters 90 which are rotated on discharge of the roast. This is a further advantage of this invention. However, the principles of this invention may be used where elements are rotating.

Although the described embodiment has been directed to roasting coffee beans, it is understood that other granular material, such as cocoa beans, nuts, peanuts, cereals and the like, may be uniformly roasted.

The invention is set forth in the appended claims.

We claim:

1. Apparatus for roasting organic material in the form of granules taken from the group consisting of coffee beans, cocoa beans, nuts, peanuts and cereals comprising a vertically extending cylindrical wall forming a cylindrically-shaped roasting chamber, shelf means extending horizontally across said chamber having means for passing heated gases substantially uniformly through said shelf means to form a dense phase fluidization of the granules in a horizontal formation and to circulate the granules vertically in the layer and horizontally extending vanes curved to the vertical and spaced above said shelf means within a horizontal formation of granules fluidized by the heated gases and having spaces between the vanes for passing circulating granules, and said curved vanes imparting a horizontal movement to circulating granules thereby compensating for roasting inequalities and producing a uniform roast.

2. Apparatus for roasting organic material in the form of granules taken from the group consisting of coffee beans, cocoa beans, nuts, peanuts and cereals comprising a vertically extending cylindrical wall forming a cylindrically-shaped roasting chamber, shelf means extending horizontally across said chamber having means for passing heated gases substantially uniformly through said shelf means to form a dense phase fluidization of the granules in a horizontal formation and to circulate the granules vertically in the layer and horizontal vanes spaced above said shelf means within horizontal formation of granules fluidized by the heated gases, said vanes being formed in four quadrants with the vanes in one quadrant at ninety degrees to the vanes of adjacent quadrants to horizontally circulate the granules thereby compensating for roasting inequalities and producing a uniform roast.

3. Apparatus for roasting organic material in the form of granules taken from the group consisting of coffee beans, cocoa beans, nuts, peanuts and cereals comprising a vertically extending cylindrical wall forming a roasting chamber, a plurality of shelf sections extending horizontally across said chamber to form a horizontal shelf means, means provided at each end of the shelf sections to rotatably support said sections between an open position for discharge of the granules and a closed position for roasting of the granules, said shelf means in the closed position having means for passing heated gases substantially uniformly through said shelf means to form a dense phase fluidization of the granules in a horizontal formation and to circulate the granules vertically in the layer, and stationary means spaced above said shelf means within a horizontal formation fluidized by the heated gases to horizontally circulate the granules thereby compensating for roasting inequalities and producing a uniform roast.

4. Apparatus as set forth in claim 3 wherein drive means are provided at each end of the shelf sections for applying rotational force to both ends of each shelf section.

5. Apparatus as set forth in claim 4 wherein said shelf means has two sets of shelf sections and said drive means has a first drive mechanism between said sets within said chamber and a second and third drive mechanism exterior to the cylindrical wall outside of said chamber.

6. Apparatus as set forth in claim 3 wherein said shelf sections have two longitudinal portions at an angle to one another.

7. Apparatus as set forth in claim 6 wherein passages are provided through said angle portions to provide streams of air at an angle to the vertical to increase the mixing of the granules.

8. Apparatus for thermally treating organic food material in the form of granules comprising a vertically extending cylindrical wall forming a generally cylindrically shaped treating chamber, a single shelf means extending horizontally across said chamber and having means for passing treating gases substantially uniformly through said shelf means to form a dense phase fluidization of the granules in a horizontal formation and to circulate the granules vertically in the layer, means for discharging granules as a batch from said shelf means on completion of the treating process, horizontally extending vane means spaced above said shelf means within a horizontal formation of the granules fluidized by the treating gases, said vane means being vanes tilted to the vertical and said vanes being in sets of vanes with the vanes of each set being parallel and forming parallel longitudinally extending spaces, said vanes of each set at an acute horizontal angle with the vanes of an adjacent set to arrange the sets around said chamber to horizontally circulate the granules around the treating chamber as the granules are vertically circulated by the treating gases to compensate for treating inequalities and produce a uniform treatment of the granules.

9. Apparatus for roasting organic material in the form of granules taken from the group consisting of coffee beans, cocoa beans, nuts, peanuts and cereals comprising a vertically extending cylindrical wall forming a cylindrically-shaped roasting chamber, a single shelf means extending horizontally across said chamber and having means for passing roasting gases substantially uniformly over said shelf means to form a dense fluidization of the granules in a horizontal layer formation and to circulate the granules vertically in the layer, means for discharging granules as a batch from said shelf means on completion of the roasting process, horizontally extending vane means spaced above said shelf means within a horizontal formation of the granules fluidized by roasting gases, said vane means being vanes tilted to the vertical and said vanes being in sets with the vanes of each set being parallel and forming parallel longitudinally extending spaces with vanes of each set at an acute horizontal angle with the vanes of an adjacent set to arrange said sets around said chamber to horizontally circulate the granules around the roasting chamber as the granules are vertically circulated by the roasting gases to compensate for roasting inequalities and produce a uniform roast of the granules.

References Cited

UNITED STATES PATENTS

| | | | |
|---|---|---|---|
| 2,702,434 | 2/1955 | Richardson et al. | 34—57 |
| 2,719,112 | 9/1955 | Kearby et al. | 34—10 |
| 3,099,538 | 7/1963 | Kronig et al. | 34—57 |

FREDERICK L. MATTESON, JR., *Primary Examiner.*

JOHN J. CAMBY, *Examiner.*